US012806698B2

(12) United States Patent
Yamada et al.

(10) Patent No.: US 12,806,698 B2
(45) Date of Patent: Nov. 24, 2026

(54) DRILL

(71) Applicant: NACHI-FUJIKOSHI CORP., Tokyo (JP)

(72) Inventors: Yudai Yamada, Toyama (JP); Kosuke Araki, Toyama (JP); Junichi Noshiro, Toyama (JP)

(73) Assignee: NACHI-FUJIKOSHI CORP. (JP)

( * ) Notice: Subject to any disclaimer, the term of this patent is extended or adjusted under 35 U.S.C. 154(b) by 232 days.

(21) Appl. No.: 18/758,192

(22) Filed: Jun. 28, 2024

(65) Prior Publication Data

US 2024/0351118 A1 Oct. 24, 2024

Related U.S. Application Data

(63) Continuation of application No. PCT/JP2023/016092, filed on Apr. 24, 2023.

(30) Foreign Application Priority Data

Apr. 29, 2022 (JP) ................................ 2022-075568

(51) Int. Cl.
*B23B 51/02* (2006.01)

(52) U.S. Cl.
CPC ...... *B23B 51/02* (2013.01); *B23B 2251/0825* (2022.01); *B23B 2251/14* (2013.01); (Continued)

(58) Field of Classification Search
CPC ............ B23B 51/02; B23B 2251/0825; B23B 2251/14; B23B 2251/182; B23B 2251/188; B23B 2251/448
See application file for complete search history.

(56) References Cited

U.S. PATENT DOCUMENTS 9,962,773 B2 * 5/2018 Koga ...................... B23B 51/02
10,259,050 B2 * 4/2019 Ogawa .................... B23B 51/02
(Continued)

FOREIGN PATENT DOCUMENTS

JP 2005-279848 A 10/2005
JP 3199122 U 8/2015
(Continued)

OTHER PUBLICATIONS

International Search Report issued in the corresponding International Application No. PCT/JP2023/016092; mailed on Jul. 25, 2023 (total 4 pages).

*Primary Examiner* — Eric A. Gates
(74) *Attorney, Agent, or Firm* — Harness, Dickey & Pierce, P.L.C.

(57) ABSTRACT

There is provided a drill including cutting edges wherein each of the cutting edges includes a first cutting edge extending outward in the radial direction from a chisel edge, a second cutting edge having a straight part extending outward in the radial direction from the first cutting edge, a third cutting edge extending outward in the radial direction and extending in a circumferential direction and toward a rear of the drill from the second cutting edge, and a fourth cutting edge extending toward the rear of the drill from the third cutting edge and connected to a leading edge. A first point angle α1 formed by the first cutting edge is set not larger than a second point angle α2 formed by the second cutting edge, and the first point angle α1 formed by the first cutting edge is set within the range of 90° to 140°.

12 Claims, 7 Drawing Sheets

(52) U.S. Cl.
CPC ... *B23B 2251/182* (2022.01); *B23B 2251/188* (2022.01); *B23B 2251/448* (2022.01)

(56) References Cited

U.S. PATENT DOCUMENTS

| | | | | |
|---|---|---|---|---|
| 10,882,121 | B2 * | 1/2021 | Nishikoori | B23B 35/00 |
| 11,364,556 | B2 * | 6/2022 | Ogawa | B23B 51/009 |
| 11,511,359 | B2 * | 11/2022 | Ogawa | B23B 51/02 |
| 2011/0268518 | A1 | 11/2011 | Sampath et al. | |
| 2017/0274461 | A1 * | 9/2017 | Mabuchi | B23B 51/02 |
| 2021/0299763 | A1 * | 9/2021 | Kauper | B23B 51/02 |
| 2023/0173594 | A1 * | 6/2023 | Ogawa | B23B 51/02<br>408/1 R |

FOREIGN PATENT DOCUMENTS

| | | | | |
|---|---|---|---|---|
| JP | 2021-065967 A | 4/2021 | | |
| JP | 2021-151681 A | 9/2021 | | |
| WO | WO-2012017645 A1 * | 2/2012 | | B23B 51/02 |

* cited by examiner

DRILL

CROSS REFERENCE TO RELATED APPLICATIONS

This application is a continuation of International Patent Application No. PCT/JP2023/016092, having an international filing date of Apr. 24, 2023, which designated the United States, the entirety of which is incorporated herein by reference. Japanese Patent Application No. 2022-075568 filed on Apr. 29, 2022 is also incorporated herein by reference in its entirety.

BACKGROUND OF THE INVENTION

The present disclosure relates to a drill capable of suppressing burrs that are formed around a drilled hole on an exit side of the drill in a work material after drilling.

In conventional drilling of a metal material typified by steel or the like using a drill, burrs are formed around a hole on an exit side of the drill after drilling. A deburring process is added after the drilling to remove burrs.

For this reason, drills capable of reducing burrs that are formed after drilling are disclosed in JP-U-3199122, JP-A-2021-65967, and JP-A-2005-279848.

These drills, however, may leave burrs around a hole on an exit side of the drill after drilling depending on the type of a work material.

JP-A-2021-151681 discloses a plurality of types of drills different in form that are classified according to a work material.

However, in the drills disclosed in JP-A-2021-151681, a point of inflection appears at a connection (joint) between a cutting edge at a drill point and a drill rear margin. Burrs may be formed around a drilled hole on an exit side of the drill in a work material depending on cutting conditions, such as high-speed rotation and high-speed feed.

DETAILED DESCRIPTION

Figure 1:
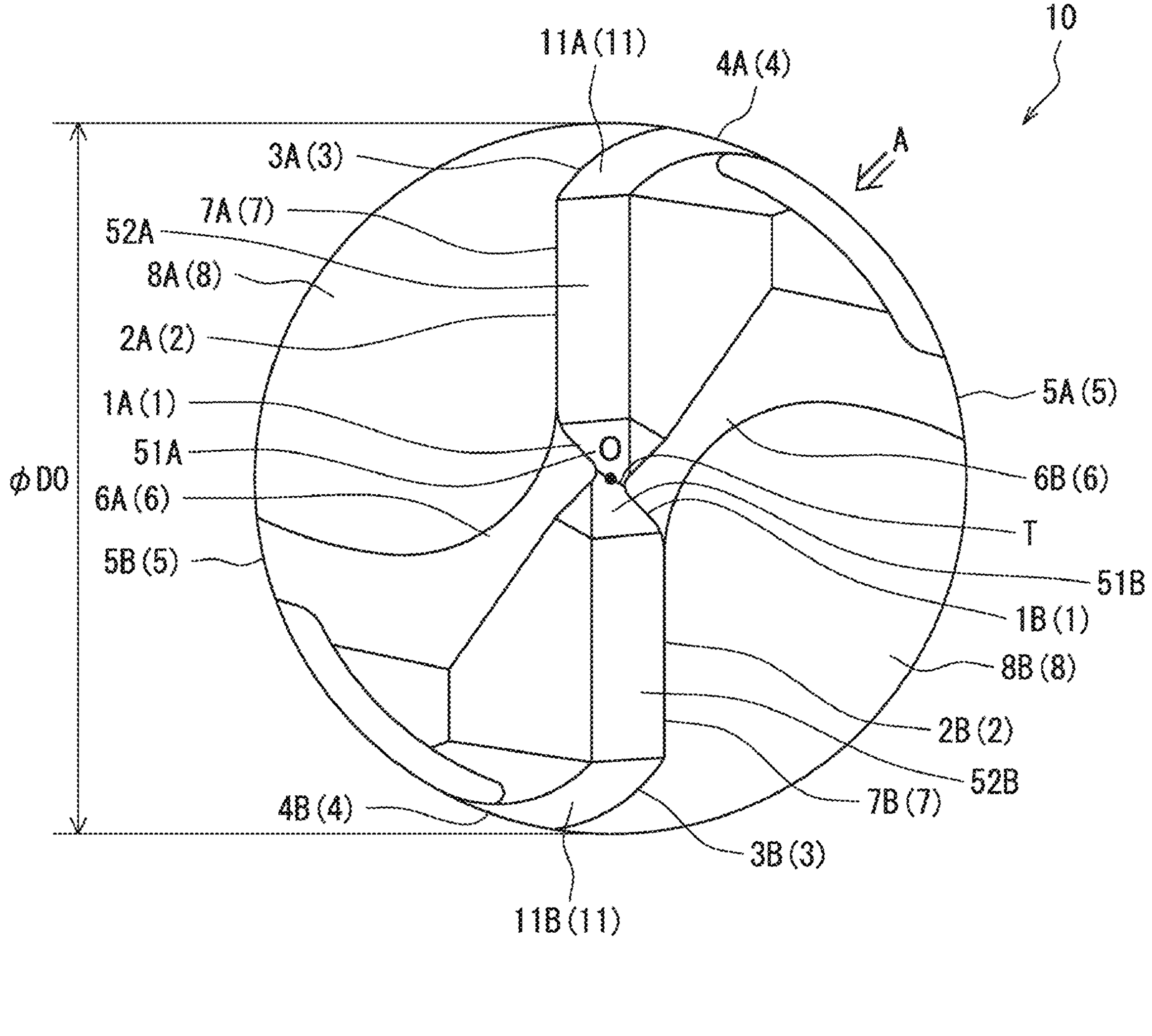
FIG. 1 is a front view of a drill 10 of the present disclosure.

The following disclosure provides many different embodiments, or examples, for implementing different features of the provided subject matter. These are, of course, merely examples and are not intended to be limiting. In addition, the disclosure may repeat reference numerals and/or letters in the various examples. This repetition is for the purpose of simplicity and clarity and does not in itself dictate a relationship between the various embodiments and/or configurations discussed. Further, when a first element is described as being "connected" or "coupled" to a second element, such description includes embodiments in which the first and second elements are directly connected or coupled to each other, and also includes embodiments in which the first and second elements are indirectly connected or coupled to each other with one or more other intervening elements in between.

It is an object of the present disclosure to provide a drill that suppresses formation of burrs around a drilled hole regardless of cutting conditions, such as high-speed rotation and high-speed feed.

To solve the aforementioned problems, a drill of the present disclosure is a drill including cutting edges formed to extend outward in a radial direction of the drill from a drill central axis, flanks adjacent to the respective cutting edges, and thinning faces formed closer to the central axis, wherein each of the cutting edges includes a first cutting edge (thinning cutting edge) adjacent to one of the thinning faces and extending outward in the radial direction of the drill from a chisel edge, a second cutting edge (major cutting edge) having a straight part extending outward in the radial direction of the drill from an end of the first cutting edge, a third cutting edge extending outward in the radial direction of the drill and extending in a circumferential direction of the drill and toward a rear of the drill from an end of the second cutting edge, and a straight or curved fourth cutting edge extending toward the rear (toward a shank) of the drill from an end of the third cutting edge and connected to a leading edge.

A point angle formed by the first cutting edge is set not larger than a point angle formed by the second cutting edge, and the point angle formed by the first cutting edge is set within the range of 90° to 140°.

If the third cutting edge and the fourth cutting edge are both curved cutting edges, a radius r4 of curvature of the fourth cutting edge can be made larger than a radius r3 of curvature of the third cutting edge.

It is also possible to connect the fourth cutting edge to the leading edge via an outer corner serving as an outermost diameter of the drill, form the flank adjacent to the fourth cutting edge to be continuous with a margin of the drill, and set an angle, the angle being formed with the leading edge by a ridge serving as a boundary between the margin and the flank adjacent to the fourth cutting edge, not less than 4° and not more than 25°.

Note that clearance angles of the third and fourth cutting edges are preferably set not less than 5° and not more than 11°.

The drill of the present disclosure exhibits the effect of finely dividing chips and discharging the chips to the outside while maintaining centrality of the drill at the time of cutting (drilling) and of suppressing formation of burrs around a drilled hole, regardless of machining conditions, such as the type of a work material, high-speed rotation, and high-speed feed.

Exemplary embodiments are described below. Note that the following exemplary embodiments do not in any way limit the scope of the content defined by the claims laid out herein. Note also that all of the elements described in the present embodiment should not necessarily be taken as essential elements An embodiment of the drill of the present disclosure will be described with reference to the drawings.

Figure 2:
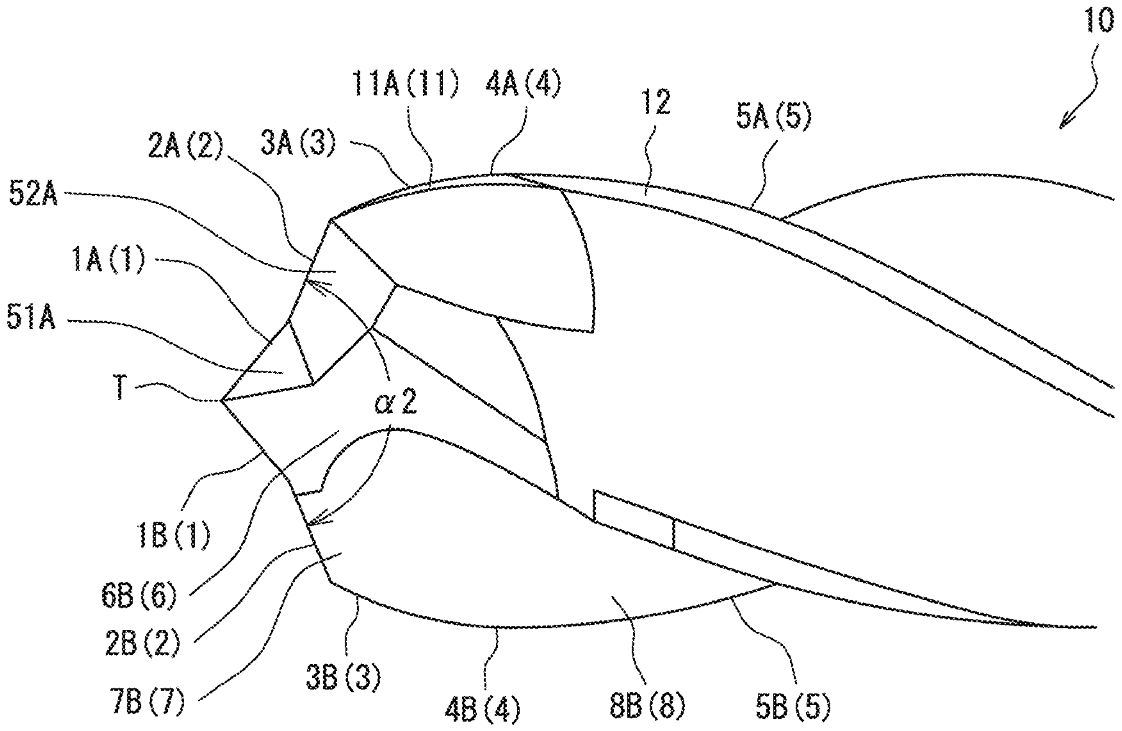
FIG. 2 is a right side view of the drill 10 illustrated in FIG. 1.
Figure 3:
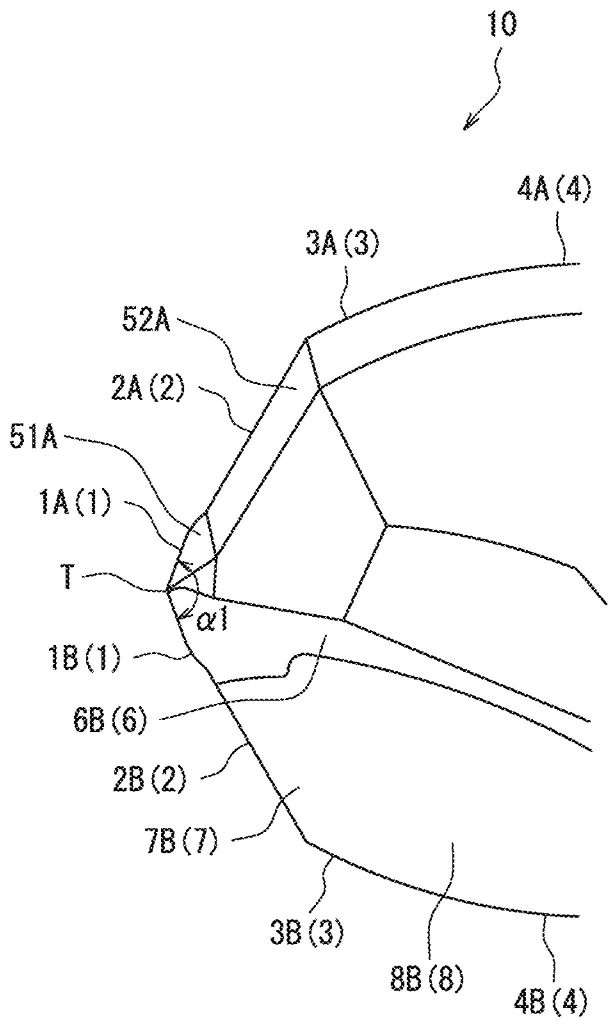
FIG. 3 is a view on arrow A of the drill 10 illustrated in FIG. 1.

A front view of a drill 10 that is an embodiment of the present disclosure is illustrated in FIG. 1, a right side view is illustrated in FIG. 2, and a view on arrow A of the drill 10 illustrated in FIG. 1 is illustrated in FIG. 3.

The drill 10 of the present disclosure includes first to fourth cutting edges 1 to 4 (1A to 4A and 1B to 4B) that extend outward in a radial direction of the drill 10 from a chisel edge T located at a tip of the drill 10, thinning faces 6 (6A and 6B), and flanks 11 (11A and 11B), 51 (51A and 51B), and 52 (52A and 52B) that are formed adjacent to the first to fourth cutting edges 1 to 4, as illustrated in FIGS. 1 and 2. Although the drill 10 of the present disclosure is an example including two cutting edges 1A to 4A and 1B to 4B that are distinguished by the suffixes A and B and two flanks 11A, 51A, and 52A and 11B, 51B, and 52B that are distinguished by the suffixes A and B, the drill 10 of the present disclosure may have three or more cutting edges and three or more flanks.

Among the flanks, the flanks (first flanks) 51 (51A and 51B) adjacent to the first cutting edges 1 (1A and 1B) and the flanks (second flanks) 52 (52A and 52B) adjacent to the second cutting edges (2A and 2B) are formed as flanks separate from and independent of each other, as illustrated in FIGS. 1 to 3.

The drill 10 of the present disclosure is shaped such that the first cutting edges (so-called inner edges) 1 (1A and 1B) that are formed adjacent to the chisel edge T closer to a central axis O protrude in a direction toward the point of the drill 10 with respect to the second cutting edges (so-called outer edges) 2 (2A and 2B) that are formed closer to an outer periphery of the drill 10 as the first cutting edges 1 approach the central axis O (the chisel edge T), as illustrated in FIG. 2.

That is, a configuration is adopted in which the first cutting edges (so-called inner edges) 1 (1A and 1B) that are formed adjacent to the first flanks 51 (51A and 51B), the second flanks 52 (52A and 52B), and the chisel edge T closer to the central axis O protrude in the direction toward the point of the drill with respect to the second cutting edges (so-called outer edges) 2 (2A and 2B) that are formed closer to the outer periphery of the drill than the first cutting edges 1 are as the first cutting edges 1 approach the central axis (chisel edge). The configuration makes it possible to finely divide chips and discharge the chips to the outside while maintaining centrality of the drill at the time of cutting (drilling).

The first cutting edges 1 (1A and 1B) are formed to be continuous outward in the radial direction of the drill 10 from the chisel edge T. The first cutting edges 1 are adjacent to the thinning faces 6 and are also called "thinning cutting edges."

The first cutting edge 1 plays a role in preventing a shake of the drill 10, i.e., maintaining the so-called centrality of the drill 10 at the time of drilling by the drill 10 of the present disclosure.

The second cutting edges 2 (2A and 2B) having straight parts that extend outward in the radial direction of the drill 10 are formed to be continuous from ends of the first cutting edges 1. The cutting edges are also called "major cutting edges."

Note that although the second cutting edges 2 (2A and 2B) illustrated in FIGS. 1 to 3 are in the form of cutting edges that extend linearly outward in the radial direction of the drill 10 from the ends of the first cutting edges 1, the second cutting edges 2 (2A and 2B) are not limited to the form.

For example, if a work material is a light metal, such as an aluminum alloy, or a difficult-to-cut material, such as stainless steel, each second cutting edge 2 (2A or 2B) can be given a form partially including a straight part or a form combining a straight part and a curved part.

As illustrated in FIGS. 1 to 3, the second cutting edge 2A is a ridge between the second flank 52A and a rake face 7A, and the second cutting edge 2B is a ridge between the flank 52B and a rake face 7B. As illustrated in FIGS. 2 and 3, flutes (helical flutes) 8 (8A and 8B) are formed to be continuous with faces 7 (7A and 7B).

Since each second cutting edge 2 has a straight part, the second cutting edge 2 plays a role in finely dividing chips generated at the time of drilling by the drill 10 of the present disclosure and discharging the chips to the outside without continuously generating chips.

The drill 10 of the present embodiment includes the two second cutting edges 2A and 2B. A point angle (second point angle) $\alpha 2$ that the two second cutting edges 2A and 2B form is an angle not smaller than a point angle (first point angle) $\alpha 1$ that the two first cutting edges 1A and 1B form, as illustrated in FIGS. 2 and 3.

A "point angle here" is assumed to be "an angle when cutting edges are projected onto a plane parallel to an axis of a drill with the cutting edges parallel to the plane", as specified in Japanese Industrial Standards (JIS) B0171.

That is, the point angle $\alpha 1$ that the first cutting edges 1A and 1B form is assumed to be an angle when the two first cutting edges 1A and 1B are projected onto a plane parallel to an axis (the central axis O) of the drill 10 with the first cutting edges 1A and 1B parallel to the plane, as illustrated in FIG. 3. The point angle $\alpha 2$ that the second cutting edges 2A and 2B form is assumed to be an angle when the two second cutting edges 2A and 2B are projected onto a plane parallel to the axis (the central axis O) of the drill 10 with the second cutting edges 2A and 2B parallel to the plane, as illustrated in FIG. 2.

Note that setting the point angle (first point angle) $\alpha 1$ that the first cutting edges 1 (1A and 1B) form within the range of 90° to 140° has the effect of enhancing the centrality (prevention of a drill shake) and the ability to bite initially (the ability to initially machine a flat work material) of the drill 10 at the start of drilling.

Figure 4:
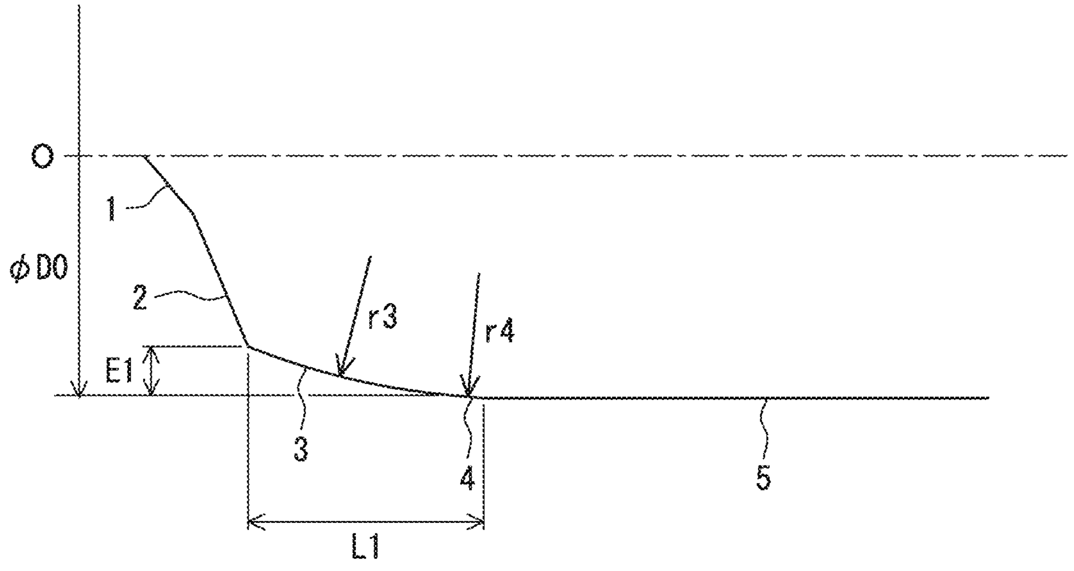
FIG. 4 is a schematic projection view in a longitudinal direction of the drill 10 of the present disclosure.
Figure 5:
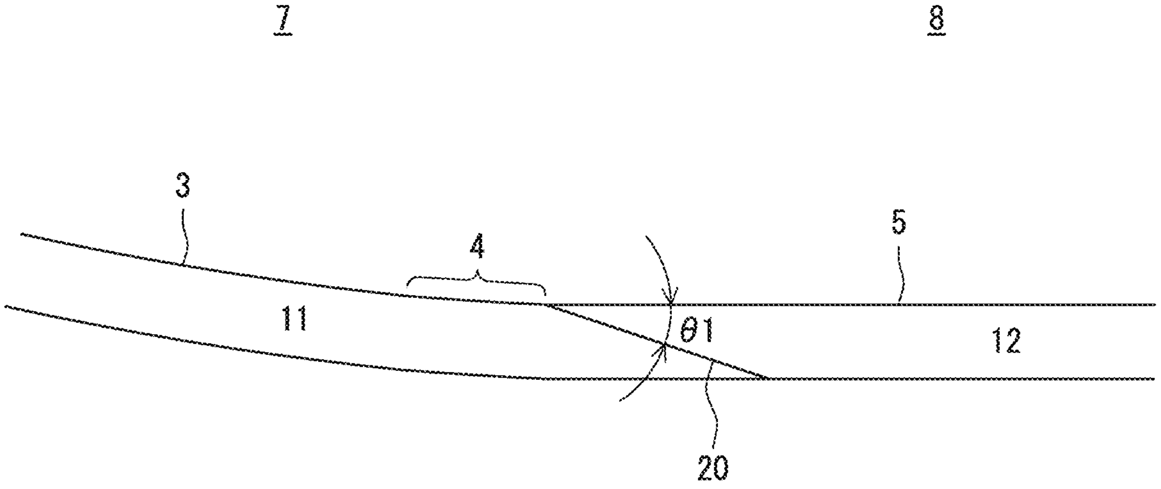
FIG. 5 is a schematic enlarged view (a first embodiment) of a vicinity of a third cutting edge 3 and a fourth cutting edge 4 in the drill 10 of the present disclosure.
Figure 6:
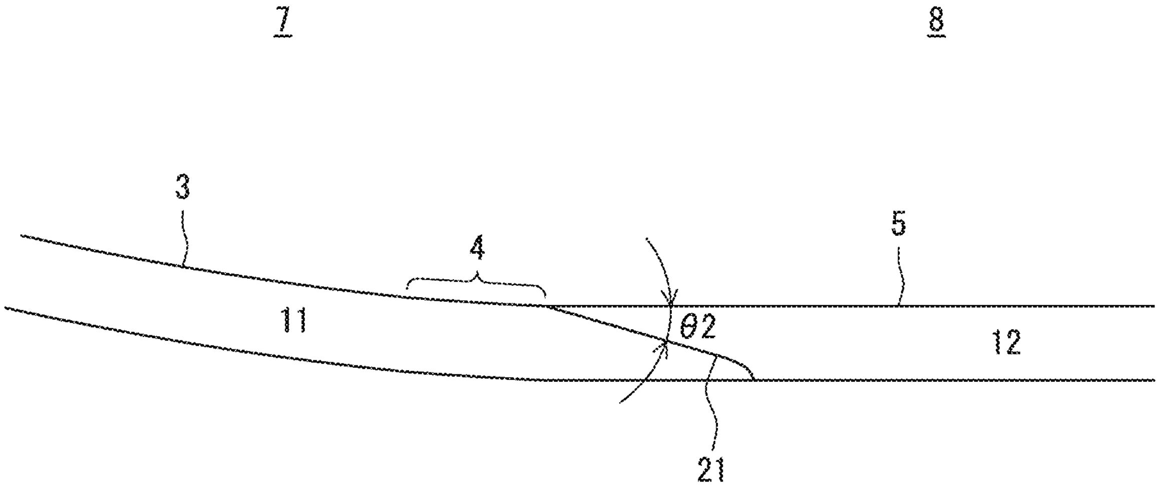
FIG. 6 is a schematic enlarged view (a second embodiment) of the vicinity of the third cutting edge 3 and the fourth cutting edge 4 in the drill 10 of the present disclosure.

A schematic projection view in a longitudinal direction (axial direction) of the drill 10 of the present embodiment is illustrated in FIG. 4, and first and second embodiments of a schematic enlarged view of a vicinity of the third cutting edge 3 and the fourth cutting edge 4 in the drill 10 are illustrated in FIGS. 5 and 6, respectively.

In the drill 10 of the present embodiment, the third cutting edges 3 (3A and 3B) that extend outward in the radial direction of the drill 10 and extend in a circumferential direction of the drill 10 and toward a rear of the drill 10 from ends of the second cutting edges 2 (2A and 2B) and the fourth cutting edges 4 (4A and 4B) that extend toward the rear of the drill 10 from ends of the third cutting edges 3 (3A and 3B) and are connected to leading edges 5 (5A and 5B) are formed, as illustrated in FIGS. 2 and 3.

The formation of the third cutting edges 3 (3A and 3B) and the fourth cutting edges 4 (4A and 4B) suppresses formation of burrs around a hole on an exit side of the drill at the time of through-hole drilling.

Each third cutting edge 3 (3A or 3B) can also be given the form of a curved cutting edge, as illustrated in FIGS. 1 to 4.

For example, two or more cutting edges different in radius of curvature from each other may be combined.

In this case, radiuses of curvature of cutting edges connected to the ends of the second cutting edges 2 (2A and 2B) can be made smaller than radiuses of curvature of cutting edges connected to the ends of the fourth cutting edges 4 (4A and 4B).

That is, radiuses of curvature of the third cutting edges 3 (3A and 3B) that are curved cutting edges can be gradually increased from a point side of the drill 10 toward a rear end side.

The fourth cutting edges 4 are either curved or straight (not illustrated). As illustrated in FIG. 5, each fourth cutting edge 4 extends toward the rear of the drill 10 and is connected to the leading edge 5 via a corner of the outer periphery.

That is, a junction between the fourth cutting edge 4 and the leading edge 5 corresponds to the corner of the outer periphery of the drill 10 that is the present embodiment and is at an outermost position of the drill 10.

If the third cutting edges 3 and the fourth cutting edges 4 are formed to be curved, as illustrated in FIG. 4, radiuses r4 of curvature of the fourth cutting edges 4 may be made larger than radiuses r3 of curvature of the third cutting edges 3.

As illustrated in FIG. 5, the flank 11 adjacent to the fourth cutting edge 4 is formed to be continuous with a margin 12 of the drill 10 of the present embodiment. Connection between the flank 11 for the fourth cutting edge 4 and the margin 12 changes gradually and obliquely from the point side of the drill 10 toward the rear end side.

An angle θ (θ1) that a straight ridge 20 (a first embodiment) that serves as a boundary between the flank 11 adjacent to the fourth cutting edge 4 and the margin 12 forms with the leading edge 5 can be set not less than 4° and not more than 25°.

As a different embodiment of the boundary between the flank 11 and the margin 12, a ridge 21 (a second embodiment) that serves as the boundary between the flank 11 and the margin 12 may include a straight part and a curved part, as illustrated in FIG. 6.

In this case as well, an angle θ (θ2) that the ridge 21 forms with the leading edge 5 is preferably not less than 4° and not more than 25°.

The angles θ (θ1 and θ2) can be optimized in accordance with elements, such as a diameter (drill diameter) ¢DO of the drill 10, angles (rake angles) of the rake faces 7 (7A and 7B), angles (helix angles) of the flutes (helical flutes) 8 (8A and 8B), axial lengths L1 and radiuses r3 and r4 of the third cutting edges 3 (3A and 3B) and the fourth cutting edges 4 (4A and 4B).

Note that the axial lengths L1 of the third cutting edges 3 (3A and 3B) and the fourth cutting edges 4 (4A and 4B) in the drill 10 of the present disclosure are preferably set to 0.10 to 0.40×ϕD0 if the diameter ϕD0 of the drill 10 is used as the base, as illustrated in FIG. 4.

In the drill 10 of the present disclosure, a radial distance (shortest distance) E1 from the end of the second cutting edge 2 (2A or 2B) to an outermost peripheral portion (an imaginary straight line parallel to the axial direction of the drill 10 and passing through the corner of the outer periphery) of the drill 10 is preferably set to 0.01 to 0.20×ϕD0 if the diameter ϕD0 of the drill 10 is used as the base, as illustrated in FIG. 4.

A cutting test (hereinafter referred to as a present test) was conducted using a drill of an embodiment of the present disclosure and conventional drills. A result of the test will be described.

A drill (hereinafter referred to as an example) according to the present disclosure used in the present test was a drill (in which a first point angle was 135°, a second point angle was 135°, a radius r3 of curvature of a third cutting edge was 3.8 mm, and an angle θ that a straight ridge serving as a boundary between a flank for a fourth cutting edge and a margin forms with a leading edge was) 10° identical to the one illustrated in FIGS. 1 to 4.

Figure 7:
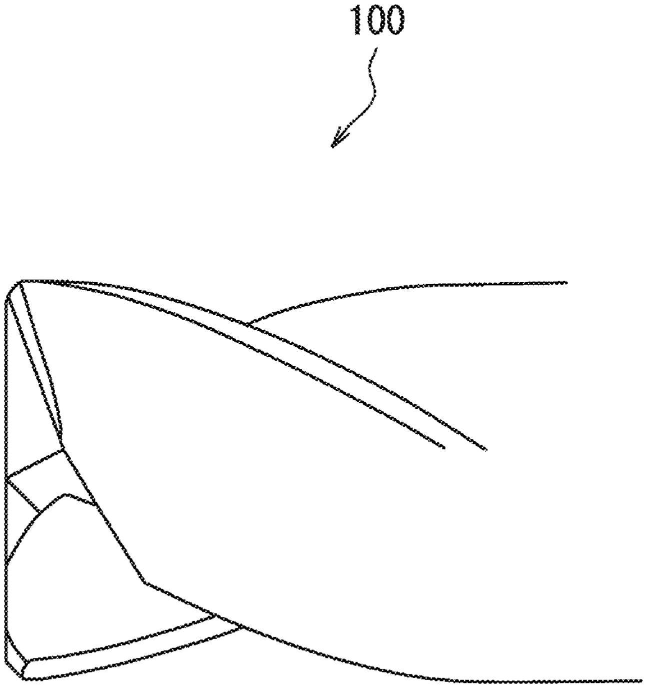
FIG. 7 is a schematic enlarged view of a point of a drill 100 that is a first comparative example (with a point angle of) 180° used in an example.
Figure 8:
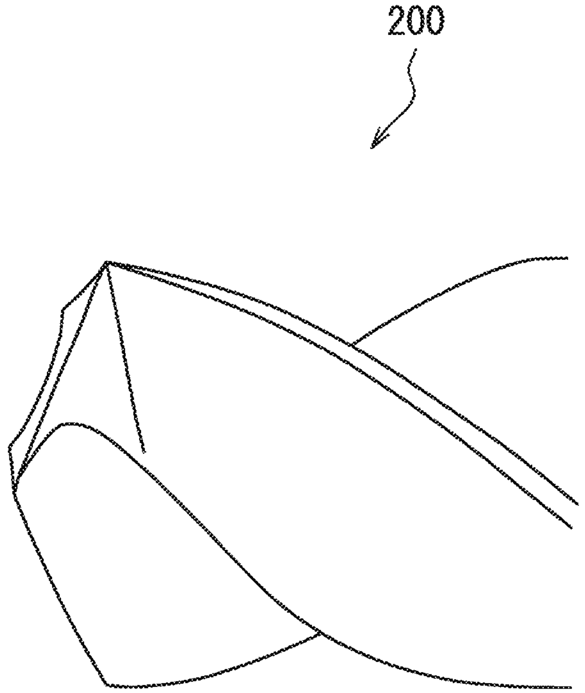
FIG. 8 is a schematic enlarged view of a point of a drill 200 that is a second comparative example (with a point angle of) 135° used in the example.

Two types of conventional drills (hereinafter referred to as comparative examples) were used. The comparative examples were: a first comparative example (a drill 100 illustrated in FIG. 7) in which a cutting edge was composed of a cutting edge (major cutting edge) corresponding to a second cutting edge of the major example and a point angle formed by the cutting edge was almost 180°; and a second comparative example (a drill 200 illustrated in FIG. 8) in which the tip angle of Comparative Example 1 was changed to 135°.

Note that the example and the first and second comparative examples were all set to have the same diameters (drill diameters) of 6 mm. A surface of each of the example and the first and second comparative examples was covered with an AlTi-based hard coating.

A work material used in the present test and machining conditions therefor were as follows.

Work material: carbon steel (S50C) having a thickness of 24 mm.

Number of revolutions: 4670 min-1 (the example), 3979 min-1 (the first comparative example), and 5305 min-1 (the second comparative example)

Feed speed: 1120 mm/min (the example), 418 mm/min (the first comparative example), and 1273 mm/min (the second comparative example)

Cutting speed: 88.0 m/min (the example), 75.0 m/min (the first comparative example), and 100.0 m/min (the second comparative example).

Feed per revolution: 0.24 mm/rev (the example and the second comparative example), and 0.105 mm/rev (the first comparative example)

Step drilling: No

Protrusion length: 47 mm

Form of machining: a through-hole (with a machining length of 24 mm)

Cooling system: external oil supply using a water-soluble cutting oil

Equipment used: a vertical machining center (BT40)

In the present test, a total of three types of drills, the example and the first and second comparative examples were used to cut a work material (S50C) under the aforementioned machining conditions until the total number of drilled holes (the cumulative number of drilled holes) reached 6000. A burr height around each drilled hole (on an exit side of the drill) was measured by a non-contact 3D shape measuring instrument.

Figure 9:
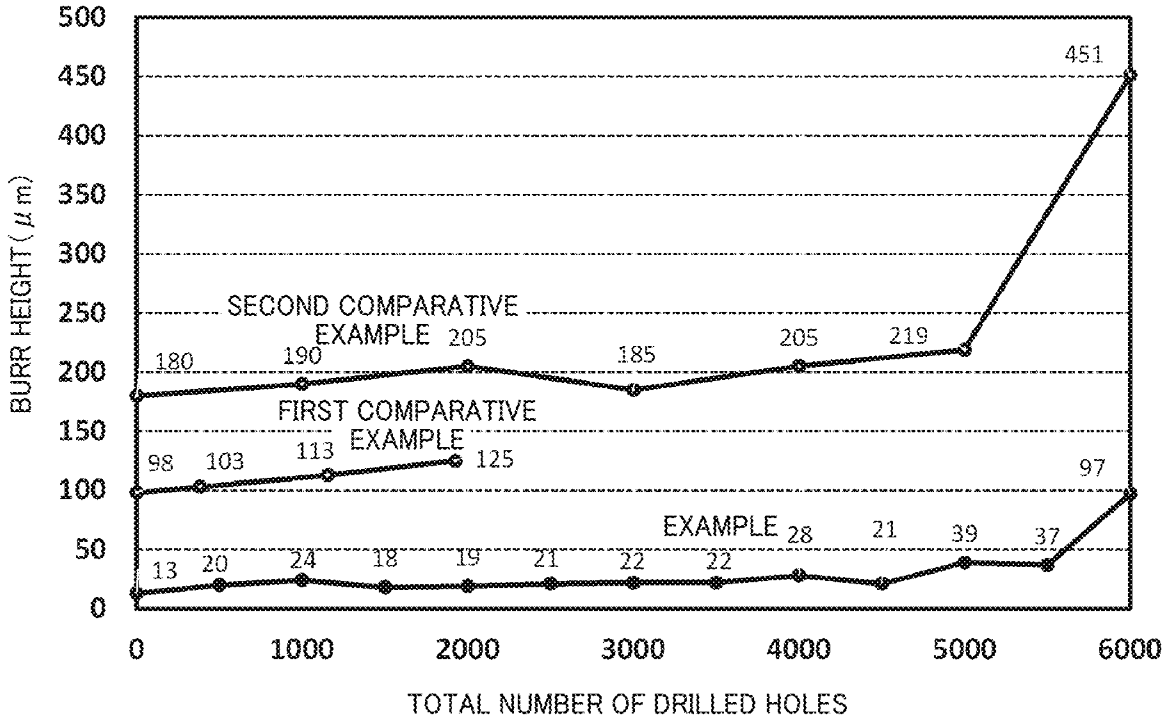
FIG. 9 is a graph representing a cutting test result.

A result of measuring a burr height around a drilled hole after cutting in the present test is illustrated in FIG. 9.

Also, a result of measuring, using a dynamometer, a cutting resistance (an X force component and a Y force component) at the time of drilling generated when each of the drills as the example and the second comparative example was used is illustrated in Table 1.

TABLE 1

| | Example | | Second comparative example | |
|---|---|---|---|---|
| | X force component | Y force component | X force component | Y force component |
| Maximum value (unit: N) | 18 | 23 | 18 | 48 |
| Minimum value (unit: N) | −17 | −14 | −−28 | −5 |
| Amplitude (unit: N) | 35 | 37 | 46 | 53 |

A result of measuring cutting resistance values (an X force component, a Y force component, and amplitudes) at the time of drilling generated when each of the drills as the example and the second comparative example was used in the present test will be described first.

As illustrated in Table 1, while an X force component of an amplitude of a cutting resistance generated when the drill as the second comparative example was used was 46 N, an X force component of an amplitude of a cutting resistance generated when the drill as the example was used was 35 N. A measurement value of the X force component decreased by 24% compared with the X force component in the drill as the second comparative example.

While a Y force component of the amplitude of the cutting resistance generated when the drill as the second comparative example was used was 53 N, a Y force component of the amplitude of the cutting resistance generated when the drill as the example was used was 37 N. A measurement value of the Y force component decreased by 30% compared with the Y force component in the drill as the second comparative example.

The above-described measurement result confirmed that centrality (prevention of a drill shake) and the ability to bite initially (the ability to initially machine a flat work material) of a drill at the start of drilling were enhanced by setting a point angle (first point angle) α1 formed by a first cutting edge not larger than a point angle (second point angle) α2 formed by a second cutting edge and setting the first point angle α1 within the range of 90° to 140° as in the drill as the example.

In the graph illustrated in FIG. 9, the axis of abscissas represents progression of the number of drilled holes using each of the aforementioned three types of drills used in the present test, and the axis of ordinates represents a maximum value (unit: μm) for a burr height on a rim of a drilled hole for each value of the number of drilled holes.

As illustrated in FIG. 9, a burr height around a hole after cutting using the example was 13 μm for a first hole, but the burr height fluctuated between 19 and 39 μm until the total number of drilled holes reached 5500. A burr height at a time point when the total number of drilled holes reached 6000 was 97 μm.

Figure 10:
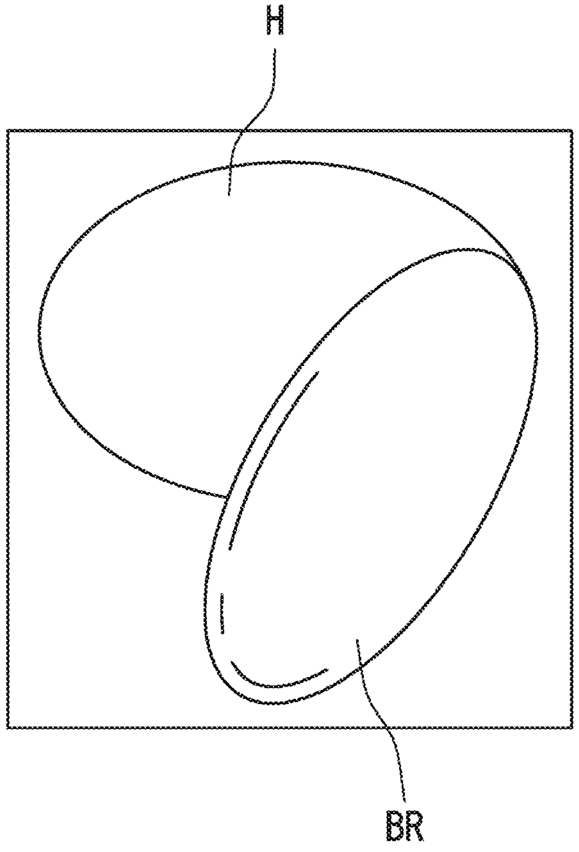
FIG. 10 is a schematic view illustrating a flap-shaped (hat-shaped) burr BR formed on an exit side of a drill around a through-hole H in a work material in the comparative example.

In contrast, in each of tests using the first and second comparative examples, a flap-like (hat-like) burr BR as illustrated in FIG. 10 was early recognized at a hole H (on an exit side of a drill) after machining.

Burr heights around holes after cutting were 98 μm and 180 μm for respective first holes. After that, the burr heights increased with increase in the numbers of drilled holes. When the total numbers of drilled holes reached 2000, the burr heights increased to 125 μm and 205 μm, respectively.

Note that, when the total number of drilled holes using the drill as the first comparative example reached 2000, a fracture occurred at a corner portion (a corner of an outer periphery), and the cutting test for the drill as the first comparative example ended at the time.

The cutting test using the drill as the second comparative example was conducted until the total number of drilled holes reached 6000. As a result, wear of a corner portion (a corner of an outer periphery) proceeded greatly, and a burr height reached 451 μm, as illustrated in FIG. 9.

The above-described cutting test results confirmed that a burr height at the time of drilling in the drill as the example decreased greatly compared with the two types of drills as the comparative examples.

As described above, third cutting edges 3 (3A and 3B) and fourth cutting edges 4 (4A and 4B) in the drill as the example was recognized as having the effect of suppressing formation of burrs around a hole on an exit side of the drill at the time of through-hole drilling.

A drill according to the present disclosure is excellent in drill centrality at the time of drilling and suppresses formation of burrs around a drilled hole, regardless of the type of a work material and machining conditions. The drill can be widely used as a drill for cutting.

Although only some embodiments of the present invention have been described in detail above, those skilled in the art will readily appreciate that many modifications are possible in the embodiments without materially departing from the novel teachings and advantages of this invention. Accordingly, all such modifications are intended to be included within scope of this invention.

The invention claimed is:

1. A drill comprising:
cutting edges formed to extend outward in a radial direction of the drill from a central axis of the drill;
flanks formed to extend outward in the radial direction of the drill from the central axis; and
thinning faces formed closer to the central axis,
wherein each of the cutting edges includes
a first cutting edge adjacent to one of the thinning faces and extending outward in the radial direction of the drill from a chisel edge,
a second cutting edge having a straight part extending outward in the radial direction of the drill from an end of the first cutting edge,
a third cutting edge extending outward in the radial direction of the drill and extending in a circumferential direction of the drill and toward a rear of the drill from an end of the second cutting edge, and
a straight fourth cutting edge extending toward the rear of the drill from an end of the third cutting edge and connected to a leading edge,
a point angle α1 formed by the first cutting edge is not larger than a point angle α2 formed by the second cutting edge, and
the point angle α1 formed by the first cutting edge is within the range of 90° to 140°.

2. The drill according to claim 1, wherein
the third cutting edge is a curved cutting edge.

3. The drill according to claim 2, wherein
the fourth cutting edge is connected to the leading edge via an outer corner,
a flank adjacent to the fourth cutting edge among the flanks is formed to be continuous with a margin of the drill, and
an angle θ, the angle θ being formed with the leading edge by a ridge serving as a boundary between the margin and the flank adjacent to the fourth cutting edge, is not less than 4° and not more than 25°.

4. The drill according to claim 3, wherein clearance angles of the third and fourth cutting edges are not less than 5° and not more than 11°.

5. The drill according to claim 1, wherein the fourth cutting edge is connected to the leading edge via an outer corner, a flank adjacent to the fourth cutting edge among the flanks is formed to be continuous with a margin of the drill, and an angle θ, the angle θ being formed with the leading edge by a ridge serving as a boundary between the margin and the flank adjacent to the fourth cutting edge, is not less than 4° and not more than 25°.

6. The drill according to claim 5, wherein clearance angles of the third and fourth cutting edges are not less than 5° and not more than 11°.

7. A drill comprising:

cutting edges formed to extend outward in a radial direction of the drill from a central axis of the drill;

flanks formed to extend outward in the radial direction of the drill from the central axis; and thinning faces formed closer to the central axis, wherein each of the cutting edges includes a first cutting edge adjacent to one of the thinning faces and extending outward in the radial direction of the drill from a chisel edge, a second cutting edge having a straight part extending outward in the radial direction of the drill from an end of the first cutting edge, a third cutting edge extending outward in the radial direction of the drill and extending in a circumferential direction of the drill and toward a rear of the drill from an end of the second cutting edge, and a curved fourth cutting edge extending toward the rear of the drill from an end of the third cutting edge and connected to a leading edge, a point angle α1 formed by the first cutting edge is not larger than a point angle α2 formed by the second cutting edge, and the point angle α1 formed by the first cutting edge is within the range of 90° to 140°.

8. The drill according to claim 7, wherein the third cutting edge is a curved cutting edge, and a radius r4 of curvature of the fourth cutting edge is larger than a radius r3 of curvature of the third cutting edge.

9. The drill according to claim 8, wherein the fourth cutting edge is connected to the leading edge via an outer corner, a flank adjacent to the fourth cutting edge among the flanks is formed to be continuous with a margin of the drill, and an angle θ, the angle θ being formed with the leading edge by a ridge serving as a boundary between the margin and the flank adjacent to the fourth cutting edge, is not less than 4° and not more than 25°.

10. The drill according to claim 9, wherein clearance angles of the third and fourth cutting edges are not less than 5° and not more than 11°.

11. The drill according to claim 7, wherein the fourth cutting edge is connected to the leading edge via an outer corner, a flank adjacent to the fourth cutting edge among the flanks is formed to be continuous with a margin of the drill, and an angle θ, the angle θ being formed with the leading edge by a ridge serving as a boundary between the margin and the flank adjacent to the fourth cutting edge, is not less than 4° and not more than 25°.

12. The drill according to claim 11, wherein clearance angles of the third and fourth cutting edges are not less than 5° and not more than 11°.

* * * * *